United States Patent

Robinson et al.

[11] Patent Number: 5,117,783
[45] Date of Patent: Jun. 2, 1992

[54] AUTOMATIC OXYGEN GENERATOR

[76] Inventors: Antonio Robinson, 3850 Hudson Manor Ter. #2B, Riverdale, N.Y. 10463; George Spector, 233 Broadway, Rm. 3815, New York, N.Y. 10007

[21] Appl. No.: 787,516
[22] Filed: Nov. 4, 1991
[51] Int. Cl.⁵ .............................. F02B 47/06
[52] U.S. Cl. ........................ 123/3; 123/DIG. 12
[58] Field of Search ............... 123/3, DIG. 12
[56] References Cited

U.S. PATENT DOCUMENTS

| | | | |
|---|---|---|---|
| 4,380,970 | 4/1983 | Davis | 123/3 |
| 4,411,223 | 10/1983 | Kiely | 123/3 |
| 4,528,947 | 7/1985 | Oliven | 123/DIG. 12 |
| 4,622,924 | 11/1986 | Lewis | 123/3 |

FOREIGN PATENT DOCUMENTS 8100279  2/1981  World Int. Prop. O. ... 123/DIG. 12

Primary Examiner—Tony M. Argenbright
Assistant Examiner—Erick Solis

[57] ABSTRACT

An apparatus for supplying additional oxygen to a combustion engine is provided which consists of a permeable container affixed against an air cleaning filter in a carburetor of the combustion engine. A mechanism is within the permeable container for converting hydrogen in the air to oxygen, when the air is sucked past the air cleaning filter entering the carburetor.

3 Claims, 1 Drawing Sheet

AUTOMATIC OXYGEN GENERATOR

BACKGROUND OF THE INVENTION

The instant invention relates generally to carburetors and more specifically it relates to an apparatus for supplying additional oxygen to a combustion engine which provides a mechanism for accomplishing the desired results within an air intake of the combustion engine.

There are available various conventional carburetors which do not provide the novel improvements of the invention herein disclosed.

SUMMARY OF THE INVENTION

A primary object of the present invention is to provide an apparatus for supplying additional oxygen to a combustion engine that will overcome the shortcomings of the prior art devices.

Another object is to provide an apparatus for supplying additional oxygen to a combustion engine, in which a faster burning of fuel will provide more power to the engine, while more efficient fuel burning will result in greater miles per gallon.

An additional object is to provide an apparatus for supplying additional oxygen to a combustion engine which will reduce pollution by a more efficient and complete oxidation of the fuel.

A further object is to provide an apparatus for supplying additional oxygen to a combustion engine that is simple and easy to use.

A still further object is to provide an apparatus for supplying additional oxygen to a combustion engine that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
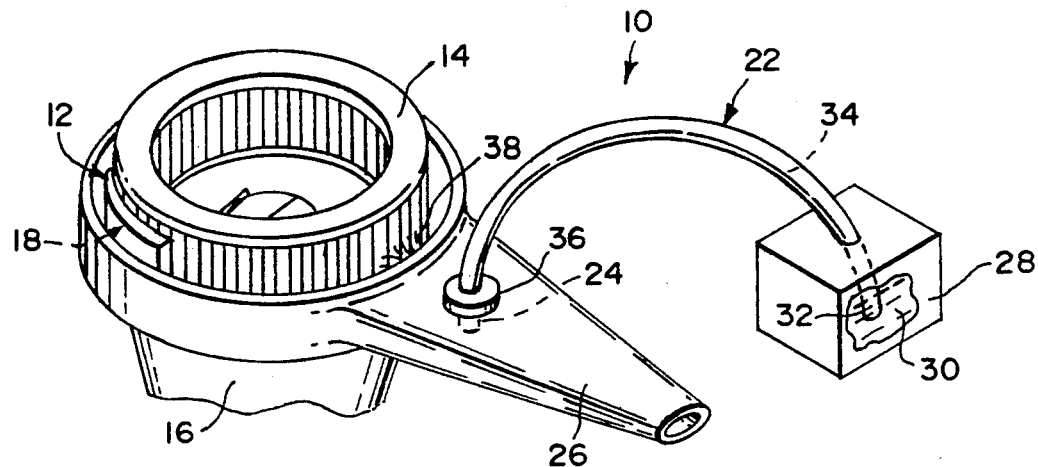
FIG. 1 is a perspective view of the instant invention installed to the air intake portion of a carburetor.
Figure 2:
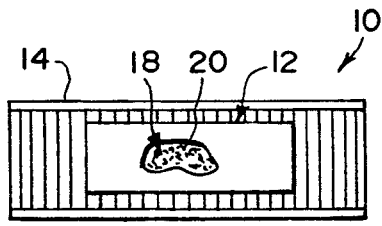
FIG. 2 is an elevational view showing the permeable container of the instant invention affixed against the air cleaning filter with parts broken away to see the chemical mixture within the permeable container.

Turning now descriptively to the drawings, in which similar reference characters denote similar elements throughout the several views, the Figures illustrate an apparatus 10 for supplying additional oxygen to a combustion engine which consists of a permeable container 12 affixed against an air cleaning filter 14 in a carburetor 16 of the combustion engine. A mechanism 18 is within the permeable container 12 for converting hydrogen in the air to oxygen, when the air is sucked past the air cleaning filter 14 entering the carburetor 16.

The converting mechanism 18 is a chemical mixture 20, which includes 90% potassium chlorate, 5% manganese dioxide and 5% cement. The apparatus 10 further includes an elongated hose 22 having a first end 24 connected to an air inlet port 26 of the carburetor 16. A tank 28 for holding water 30 has a second end 32 of the elongated hose 22 connected thereto. A rayon texture 34 is formed within the elongated hose 22, while a thermostatic valve 36 is attached to the elongated hose 22. When the temperature reaches a predetermined level, the thermostatic valve 36 will open to allow the rayon texture 34 within the elongated hose 22, which is moistened by the water 30, from the tank 28 and agitated by the hot air entering the air inlet port 26 to transform the water 30 into nucleus hydrogen gas 38 to mix with the chemical mixture 20 in the permeable container 12 to produce a high quality of oxygen.

Figure 3:
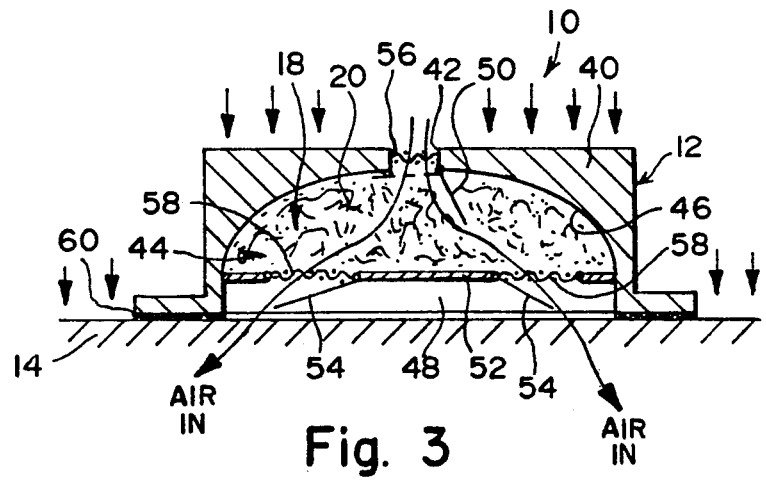
FIG. 3 is a cross sectional view of a modified permeable container.

As shown in FIG. 3, the permeable container 12 is modified and includes a housing 40 having a small inlet port 42 extending into a chamber 44 with a curved inner wall 46 and a large outlet port 48. A one way inlet valve 50 is mounted in the inlet port 42 of the housing 40. A recessed partition 52 is formed across the large outlet port 48 of the housing 40, so that the chemical mixture 20 can be retained within the chamber 44 of the housing 40. A pair of one way outlet valves are mounted in a spaced apart relationship in the recessed partition 52. A first screen member 56 is mounted in the inlet port 42 of the housing 40. A pair of second screen members 58 are each mounted at one of the outlet valves 5 in the recessed partition 52. Adhesive 60 is for affixing the housing 40 to the air cleaning filter 14. When the air enters the inlet port 42, the one way inlet valve 50 will open allowing the air to pass through the chemical mixture 20 and then the oxygen enhanced air will exit through the one way outlet valves 54 past the air cleaning filter 14 into the carburetor 16. Oxygen enhanced air can be provided for diesel or fuel injection systems.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for supplying additional oxygen to a combustion engine which comprises:
   a) a permeable container affixed against an air cleaning filter in a carburetor of the combustion engine; and
   b) means within said permeable container for converting hydrogen in the air to oxygen, when the air is sucked past the air cleaning filter entering the carburetor, said means being a chemical mixture which includes 90% potassium chlorate, 5% manganese dioxide and 5% cement.

2. An apparatus for supplying additional oxygen to a combustion engine as recited in claim 1, further including:
   a) an elongated hose having a first end connected to an air inlet port of the carburetor;
   b) a tank for holding water having a second end of said elongated hose connected thereto;
   c) a rayon texture formed within said elongated hose; and
   d) a thermostatic valve attached to said elongated hose, so that when the temperature reaches a predetermined level, said thermostatic valve will open to allow said rayon texture within said elongated hose, which is moistened by the water from said tank and agitated by the hot air entering the air inlet port, to transform the water into nucleus hydrogen gas to mix with said chemical mixture in said permeable container to produce a high quality of oxygen.

3. An apparatus for supplying additional oxygen to a combustion engine as recited in claim 2, wherein said permeable container includes:
   a) a housing having a small inlet port extending into a chamber with a curved inner wall and a large outlet port;
   b) a one way inlet valve mounted in said inlet port of said housing;
   c) a recessed partition formed across said large outlet port of said housing, so that said chemical mixture can be retained within said chamber of said housing;
   d) a pair of one way outlet valves mounted in a spaced apart relationship in said recessed partition;
   e) a first screen member mounted in said inlet port of said housing;
   f) a pair of second screen members, each mounted at one of said outlet valves in said recessed partition; and
   g) adhesive for affixing said housing to the air cleaning filter, so that when the air enters said inlet port said one way inlet valve will open allowing the air to pass through said chemical mixture and then the oxygen enhanced air will exit through said one way outlet valves past the air cleaning filter into the carburetor.

* * * * *